US011828830B1

(12) United States Patent
Li et al.

(10) Patent No.: US 11,828,830 B1
(45) Date of Patent: Nov. 28, 2023

(54) LADCP AND COMBINED INERTIAL NAVIGATION SYSTEM COMBINED OBSERVATION SYSTEM AND METHOD

(71) Applicant: FIRST INSTITUTE OF OCEANOGRAPHY, MINISTRY OF NATURAL RESOURCES, Qingdao (CN)

(72) Inventors: Shujiang Li, Qingdao (CN); Guanhui Liang, Qingdao (CN); Guanlin Wang, Qingdao (CN); Fei Teng, Qingdao (CN); Tengfei Xu, Qingdao (CN); Yonggang Wang, Qingdao (CN); Zexun Wei, Qingdao (CN)

(73) Assignee: FIRST INSTITUTE OF OCEANOGRAPHY, MINISTRY OF NATURAL RESOURCES, Qingdao (CN)

( * ) Notice: Subject to any disclaimer, the term of this patent is extended or adjusted under 35 U.S.C. 154(b) by 0 days.

(21) Appl. No.: 18/195,151

(22) Filed: May 9, 2023

(30) Foreign Application Priority Data

Aug. 25, 2022 (CN) .......................... 202211023742.7

(51) Int. Cl.
*G01S 19/49* (2010.01)
(52) U.S. Cl.
CPC .................... *G01S 19/49* (2013.01)
(58) Field of Classification Search
CPC ........ G01S 15/10; G01S 1/763; G01S 15/107; G01S 15/874; G01S 7/524; G01S 7/52;
(Continued)

(56) References Cited

U.S. PATENT DOCUMENTS 10,852,317 B1 * 12/2020 Guo .................. G01S 7/527
2012/0046863 A1 * 2/2012 Hope ..................... B64G 3/00
701/531

FOREIGN PATENT DOCUMENTS

CN 101644716 A 2/2010
CN 104965102 A 10/2015
(Continued)

OTHER PUBLICATIONS

Godhavn et al., "Precise Heading and DGPS Measurements of Vessel Motion Improve VM-ADCP Current Measurements Significantly," The 25th International Ocean and Polar Engineering Conference, Jun. 21, 2015, pp. 1435-1440.
(Continued)

*Primary Examiner* — Brandi N Hopkins
(74) *Attorney, Agent, or Firm* — Oliff PLC

(57) ABSTRACT

An LADCP and combined inertial navigation system combined observation system and method. The system includes an LADCP, combined inertial navigation system host, data processing unit, wireless transmission module, voltage-resistant wireless antenna, battery cabin, first and second GNSS antennae and an instrument support. The data processing unit is connected to the LADCP and the system host through serial ports to obtain ocean current profile measurement data, a GNSS position, GNSS orientation data, three-axis acceleration data, a three-axis gyroscope angular velocity, a roll angle, a pitch angle and a course angular rate. Real-time high-precision correction is performed on a three-dimensional flow velocity of an ocean current profile observed by the LADCP based on the orientation data, roll angle, pitch angle and the course angular rate. Accordingly, measurement precision of flow velocity and flow direction by the LADCP is improved, and working costs to carry out profile flow observation are reduced.

7 Claims, 4 Drawing Sheets

(58) Field of Classification Search
CPC . G01S 15/02; G01S 15/88; G01S 1/72; G01S 7/52003; G01S 7/521; G01S 19/49; G01V 1/38; G01F 1/663
See application file for complete search history.

(56) References Cited

FOREIGN PATENT DOCUMENTS

| | | | | |
|---|---|---|---|---|
| CN | 113624211 A | * | 11/2021 | .............. G01P 5/241 |
| CN | 113624211 A | | 11/2021 | |
| WO | 2013/120963 A2 | | 8/2013 | |

OTHER PUBLICATIONS

Oct. 10, 2022 Office Action issued in Chinese Patent Application No. 202211023742.7.

Oct. 24, 2022 Notice of Allowance issued in Chinese Patent Application No. 202211023742.7.

* cited by examiner

LADCP AND COMBINED INERTIAL NAVIGATION SYSTEM COMBINED OBSERVATION SYSTEM AND METHOD

TECHNICAL FIELD

The present invention belongs to the field of ocean current observation, and in particular, relates to an LADCP and combined inertial navigation system combined observation system and method.

BACKGROUND

AN LADCP (Lowered Acoustic Doppler Current Profiler, lowered acoustic Doppler current profiler) is a current profile measurement method that appeared in the 1990s. It can quickly obtain large-scale and full-depth ocean current profile data. and has been widely used in investigation at home and abroad. The LADCP is usually used with a CTD (Conductivity-Temperature-Depth profiler, temperature, conductivity-temperature-depth profiler), and rises and falls together with a CTD underwater unit, lowers from the sea surface to the seabed at a certain speed, and then lifts from the seabed to the sea surface, to obtain a series of small individual flow velocity profiles. These small flow velocity profiles need to be processed later to obtain a flow velocity profile at the entire measurement depth through overlap computing.

A flow velocity direction directly measured by LADCP is a relative velocity and direction of the ocean current relative to the LADCP, and this flow velocity direction is a true velocity of the ocean current only when the LADCP is still. Because the LADCP adopts drop-in measurement, a steel cable has a certain angle of inclination, and a surveying ship cannot guarantee an absolute zero velocity, values of a vertical velocity and a horizontal velocity of the LADCP are large and irregular. Therefore, how to extract the true velocity of the ocean current from the measurement velocity of LADCP has always been a difficult problem in an LADCP measurement technology. At present, during an LADCP measurement process, a velocity of the LADCP instrument itself relative to the seabed is obtained through a bottom tracking technology, and then the velocity of the ocean current is obtained. However, the bottom tracking technology is only meaningful near a bottom layer, and the bottom tracking cannot accurately calculate a three-dimensional movement velocity at each moment during the whole lowering process of the LADCP. In marine navigation observation work, sometimes due to the limitation of working time, the LADCP cannot be lowered to the seabed to measure to-bottom tracking data every time. This leads to a large measurement error or even failure of LADCP measurement. The LADCP uses its own magnetic compass to measure the flow direction. As a huge ferromagnetic object, the surveying ship may have a great impact on the flow direction measurement of LADCP at an early stage of lowering.

In an existing LADCP ocean current observation method, there no device and method for real-time and high-precision correction of current velocity and direction observation data, resulting in a large error in ocean current velocity and direction observation. In addition, the to-bottom tracking data must be observed in each observation process, consequently, working efficiency of ocean current profile measurement is low, and ocean working costs are increased.

SUMMARY

To resolve the technical problem, the present invention discloses a technical solution of an LADCP and combined inertial navigation system combined observation system and method.

According to a first aspect of the present invention, an LADCP and combined inertial navigation system combined observation system is disclosed. The system includes an LADCP, a combined inertial navigation system host, a data processing unit, a wireless transmission module, a voltage-resistant wireless antenna, a battery cabin, a first GNSS antenna, a second GNSS antenna and an instrument support.

The LADCP, namely a lowered type acoustic Doppler current profiler, is mounted below an inner portion of the instrument support, the combined inertial navigation system host, the data processing unit, the wireless transmission module and the battery cabin are separately mounted in the instrument host, the combined inertial navigation system host, the data processing unit, the wireless transmission module and the battery cabin are located above the LADCP, the voltage-resistant wireless antenna is mounted above the wireless transmission module, and the first GNSS antenna and the second GNSS antenna are mounted above an outer portion of the instrument support.

The battery cabin supplies power to the LADCP, the combined inertial navigation system host, the data processing unit, the wireless transmission module, the first GNSS antenna, and the second GNSS antenna.

The first GNSS antenna and the second GNSS antenna receive a GNSS satellite signal and transmit the GNSS satellite signal to the combined inertial navigation system host through a coaxial cable.

The LADCP is configured to observe ocean current profile measurement data in real time.

The combined inertial navigation system host observes a GNSS position, GNSS orientation data, three-axis acceleration data, a three-axis gyroscope angular velocity, a roll angle, a pitch angle, and a course angular rate.

The data processing unit is connected to the wireless transmission module through a serial port, and the wireless transmission module is configured to transmit communication data between the data processing unit and a mother ship deck unit through the voltage-resistant wireless antenna.

The data processing unit is connected to the LADCP and the combined inertial navigation system host through serial ports to obtain the ocean current profile measurement data, the GNSS position, the GNSS orientation data, the three-axis acceleration data, the three-axis gyroscope angular velocity, the roll angle, the pitch angle and the course angular rate, and is configured to perform real-time high-precision correction on a three-dimensional flow velocity of an ocean current profile observed by the LADCP based on the GNSS orientation data, the roll angle, the pitch angle and the course angular rate.

According to the system of the first aspect, the combined observation system further includes a first voltage-resistant cabin, a second pressure-resistance cabin and a third voltage-resistant cabin.

The first voltage-resistant cabin and the second voltage-resistant cabin are located above the outer portion of the instrument support.

The first GNSS antenna is mounted inside the first voltage-resistant cabin.

The second GNSS antenna is mounted inside the second voltage-resistant cabin.

The third voltage-resistant cabin is positioned above the LADCP inside the instrument support, the combined inertial navigation system host, the data processing unit, the wireless transmission module, and the battery cabin are separately mounted inside the voltage-resistant cabin, and the voltage-resistant wireless antenna is mounted above the third voltage-resistant cabin.

The first voltage-resistant cabin and the second voltage-resistant cabin are respectively connected to the third voltage-resistant cabin through a coaxial watertight cable and a watertight connector assembly, and the LADCP is connected to the third voltage-resistant cabin through a watertight cable.

According to the system of the first aspect, north of the LADCP is aligned with north of the combined inertial navigation system host.

According to a second aspect of the present invention, an LADCP and combined inertial navigation system combined observation method is disclosed, which adopts the LADCP and combined inertial navigation system combined observation system according to any one of the implementations of the first aspect. An operation method for the LADCP to observe the ocean current profile measurement data in real time and for the combined inertial navigation system host to observe the GNSS position, the GNSS orientation data, the three-axis acceleration data, the three-axis gyroscope angular velocity, the roll angle, the pitch angle and the course angular rate includes:
  after an observation ship reaches an observation point, aligning a coordinate system of the LADCP to a coordinate system of the combined inertial navigation system host, that is, aligning the north of the LADCP to the north of the combined inertial navigation system host;
  lifting the combined observation system to a sea surface, and receiving data transmitted back by the data processing unit by using a mother ship deck unit;
  lowering the combined observation system to an undersea preset depth to observe the ocean current profile measurement data; and
  withdrawing the combined observation system after observing the ocean current profile measurement data.

According to the method of the second aspect, the operation method further includes:
  after determining the GNSS position and the GNSS orientation data of the combined inertial navigation system host, lowering the combined observation system to the undersea preset depth.

According to the method of the second aspect, a method for performing real-time high-precision correction on the three-dimensional flow velocity of the ocean current profile observed by the LADCP based on the GNSS orientation data, the roll angle, the pitch angle and the course angular rate includes:
  performing discrete-time integration on the course angular rate to obtain a course angle by using a last group of pre-water GNSS orientation data $D_0$ that does not lose lose efficacy as an initial value;
  performing a first-time correction, namely an attitude correction, on the three-dimensional flow velocity, a three-dimensional linear velocity, and a three-dimensional angular velocity of the ocean current profile based on the roll angle, the pitch angle and the course angle, to obtain a first-time corrected three-dimensional flow velocity, a first-time corrected three-dimensional linear velocity, and a first-time corrected angular velocity;
  performing a second-time correction, namely a linear velocity correction, on the first-time corrected three-dimensional flow velocity based on the first-time corrected three-dimensional linear velocity, to obtain a second-time corrected three-dimensional flow velocity; and
  performing a third-time correction, namely an angular velocity correction, on the second-time corrected three-dimensional flow velocity based on the first-time corrected three-dimensional angular velocity, to obtain a third-time corrected three-dimensional flow velocity, namely a final correction result of the three-dimensional flow velocity of the ocean current profile.

According to the method of the second aspect,
  before the performing discrete-time integration on the course angular rate to obtain a course angle by using a last group of pre-water GNSS orientation data $D_0$ that does not lose lose efficacy as an initial value, the method further includes:
  eliminating an instant gross error, caused by a noise of the LADCP and an external environment, of a discrete sampling value of the course angular rate of the LADCP, and a specific method includes:
  calculating an arithmetic mean value of a discrete sampling value sequence of the course angular rate;
  calculating standard deviation of the discrete sampling value sequence of the course angular rate;
  calculating a flag value of the discrete sampling value sequence of the course angular rate based on the arithmetic mean value and the standard deviation, and a specific formula is as follows:

$$g_t = \frac{|(\Omega_{\gamma t} - \overline{\Omega_\gamma})|}{s},$$

where
  $g_t$ represents a flag value of a sampling value t in the discrete sampling value sequence of the course angular rate, s represents the standard deviation, $\Omega_{\gamma t}$ represents a discrete sampling value of a $t^{th}$ course angular rate in the sequence, and $\overline{\Omega_\gamma}$ represents the arithmetic mean value;
  comparing a flag value corresponding to the discrete sampling value sequence of the course angular rate in the sequence with a preset critical value, retaining the discrete sampling value sequence of the course angular rate if the flag value is less than the critical value, and removing the discrete sampling value sequence of the course angular rate if the flag value is not less than the critical value;
  filtering a direct-current component of the discrete sampling value sequence of the course angular rate, and a specific method includes:
  performing discrete Fourier transform on the discrete sampling value, the instant gross error of which is eliminated, of the course angular rate; and
  performing the discrete Fourier transform after setting a frequency spectrum component with a frequency of 0 in a spectrogram to 0, to obtain the discrete sampling value, the direct-current component of which is filtered, of the course angular rate.

According to the method of the second aspect, a method for performing discrete-time integration on the course angular rate to obtain a course angle by using a last group of pre-water GNSS orientation data $D_0$ that does not lose lose efficacy as an initial value includes:
by taking the last group of pre-water GNSS orientation data $D_0$ that does not lose lose efficacy as the initial value and taking a sampling moment of the last group of pre-water GNSS orientation data that does not lose lose efficacy as a time zero, obtaining a rotation angle of the LADCP within a preset moment by using a method of performing discrete-time integration on the course angular rate, and obtaining the course angle by performing 360 remaining on the rotation angle of the LADCP.

According to the method of the second aspect, a method for performing a first-time correction on the three-dimensional flow velocity, a three-dimensional linear velocity, and a three-dimensional angular velocity of the ocean current profile based on the roll angle, the pitch angle and the course angle, to obtain a first-time corrected three-dimensional flow velocity, a first-time corrected three-dimensional linear velocity, and a first-time corrected angular velocity level includes:

$$X' = X \cos\beta \cos\gamma + Y(\cos\gamma \sin\alpha \sin\beta - \sin\gamma \cos\alpha) + Z(\cos\alpha \sin\beta \cos\gamma + \sin\alpha \sin\gamma)$$

$$Y' = X \sin\gamma \cos\beta + Y(\sin\alpha \sin\beta \sin\gamma + \cos\alpha \cos\gamma) + Z(\sin\beta \sin\gamma \cos\alpha - \cos\gamma \sin\alpha)$$

$$Z' = -X \sin\beta + Y \cos\beta \sin\alpha + Z \cos\alpha \cos\beta, \text{ where}$$

(X,Y,Z) represents an corrected vector measurement result, $X \in \{nvt, V\alpha t, \Omega\alpha t\}$, $Y \in \{eut, V\beta t, \Omega\beta t\}$, $Z \in \{wt, V\gamma t, \Omega\gamma t\}$ and (nvt, eut, wt) represent three-dimensional flow velocities, ($V\alpha t, V\beta t, V\gamma t$) represents the three-dimensional linear velocity, ($\Omega\alpha t, \Omega\beta t, \Omega\gamma t$) represents the three-dimensional angular velocity, $\alpha$ represents the roll angle, R represents the pitch angle, $\gamma$ represents the course angle, (X', Y', Z') represents a first-time corrected vector correction result, $X' \in \{nvt', V\alpha t', \Omega\alpha t'\}$, $YE \{eut', V\beta t', \Omega\beta t'\}$, $Z' \in \{wt', V\gamma t', \Omega\gamma t'\}$ and (nvt', eut', wt') represent first-time corrected three-dimensional flow velocities, ($V\alpha t', V\beta t', V\gamma t'$) represents a first-time corrected three-dimensional linear velocity, and ($\Omega\alpha t', \Omega\beta t', \Omega\gamma t'$) represents a first-time corrected three-dimensional angular velocity;

performing a second-time correction velocity correction, on the first-time corrected three-dimensional flow velocity based on the first-time corrected three-dimensional linear velocity, to obtain a second-time corrected three-dimensional flow velocity; and performing vector addition on the first-time corrected three-dimensional linear velocity and the first-time corrected three-dimensional flow velocity to obtain a second-time corrected three-dimensional flow velocity, and a specific formula is as follows:

$$(nvt'', eut'', wt'') = (nvt', eut', wt') + (V\alpha t', V\beta t', V\gamma t'), \text{ where}$$

(nvt'', eut'', wt'') represents the second corrected three-dimensional flow velocity; and a method for performing a third-time correction, namely an angular velocity correction, on the second-time corrected three-dimensional flow velocity based on the first-time corrected three-dimensional angular velocity, to obtain a third-time corrected three-dimensional flow velocity includes: multiplying a distance R between a beam outlet of the LADCP and a lifting point of the instrument support with the first-time corrected three-dimensional angular velocity to obtain a three-dimensional rotation linear velocity, and performing vector addition on the three-dimensional rotation linear velocity and the second-time corrected three-dimensional flow velocity to obtain the third-time corrected three-dimensional flow velocity, and a specific formula is as follows:

$$(NV_t, EU_t, W_t) = (nv_t'', eu_t'', w_t'') + R \times (\Omega_{\alpha t}', \Omega_{\beta t}', \Omega_{\gamma t}'),$$
where (NVt, EUt, Wt) represents the third-time corrected three-dimensional flow velocity, namely the final correction result of the three-dimensional flow velocity of the ocean current profile.

According to solution in the present invention, measurement precision of a flow velocity and a flow direction by the LADCP is improved, and working costs of using the LADCP to carry out profile flow observation are reduced.

BRIEF DESCRIPTION OF DRAWINGS

In order to explain the technical solutions in embodiments of the present invention or the conventional technology more clearly, the drawings used in the embodiments or the conventional technology will be briefly introduced below. Obviously, the drawings in the following description are some embodiments of the present invention. For a person of ordinary skill in the art, other drawings can be obtained based on these drawings without paying creative labor.

In the figures: 1, instrument support; 2, first voltage-resistant cabin; 3, second voltage-resistant cabin; 4, voltage-resistant wireless antenna; 5, third voltage-resistant cabin; and 6, LADCP.

DETAILED DESCRIPTION OF EMBODIMENTS

In order to make the objectives, technical solutions, and advantages of embodiments of the present invention clearer, the technical solutions in embodiments of the present invention will be described clearly and completely in combination with the drawings in embodiments of the present invention. Obviously, the described embodiments are part of, but not all of, embodiments of the present invention. Based on embodiments in the present invention, all other embodiments obtained by a person of ordinary skill in the art without creative efforts shall fall within the protection scope of the present invention.

Embodiment 1

Figure 1:
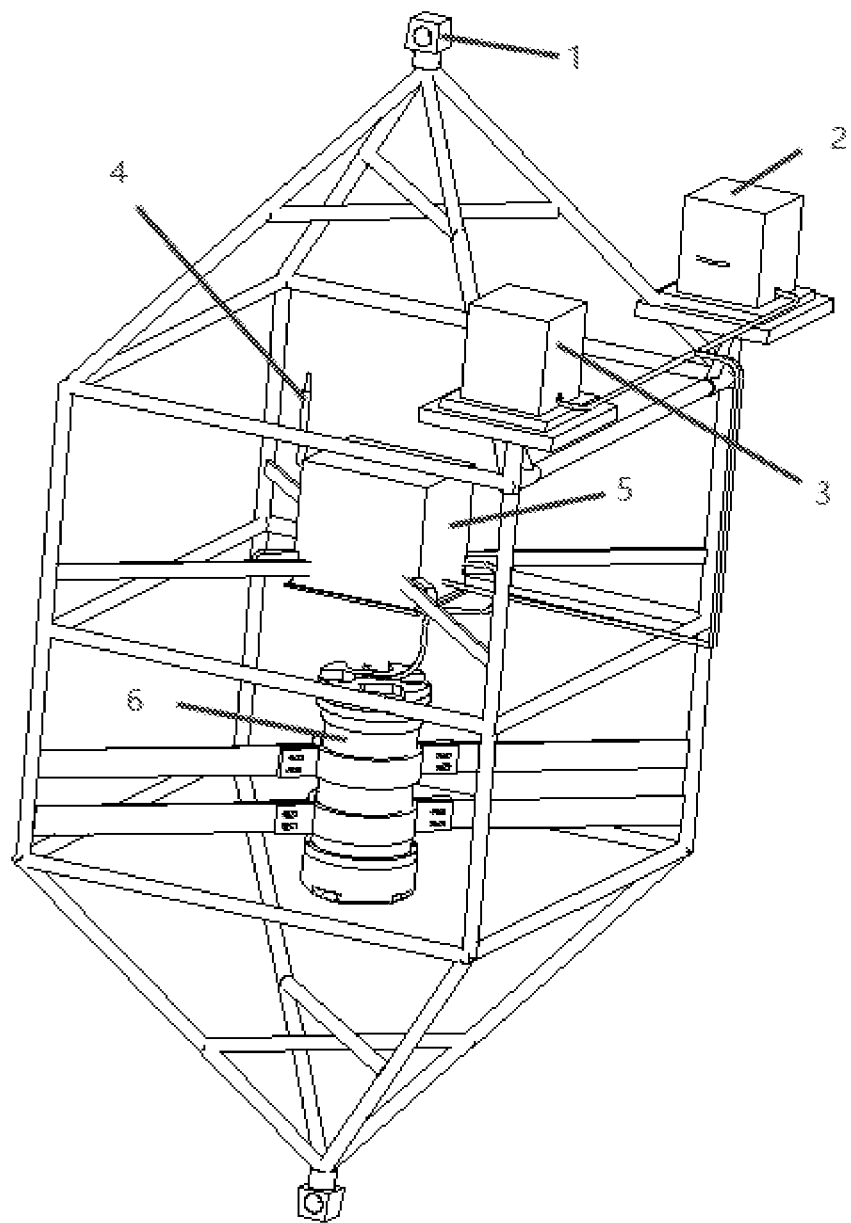
FIG. 1 is a structural diagram of an LADCP and combined inertial navigation system combined observation system according to an embodiment of the present invention.

According to a first aspect of the present invention, an LADCP and combined inertial navigation system combined observation system is disclosed. FIG. 1 is a structural diagram of an LADCP and combined inertial navigation system combined observation system according to an embodiment of the present invention. As shown in FIG. 1, the system includes an LADCP 6, a combined inertial navigation system host, a data processing unit, a wireless transmission module, a voltage-resistant wireless antenna 4, a battery cabin, a first GNSS antenna, a second GNSS antenna and an instrument support 1.

The LADCP 6, namely a lowered type acoustic Doppler current profiler, is mounted below an inner portion of the instrument support 1, the combined inertial navigation system host, the data processing unit, the wireless transmission module, and the battery cabin are mounted above the LADCP 6 inside the instrument support 1, the voltage-resistant wireless antenna 4 is mounted above the wireless transmission module, and the first GNSS antenna and the second GNSS antenna are mounted above an outer portion of the instrument support 1.

The battery cabin supplies power to the LADCP 6, the combined inertial navigation system host, the data processing unit, the wireless transmission module, the first GNSS antenna, and the second GNSS antenna, to ensure that each module of a profile current measurement process works normally.

The first GNSS antenna and the second GNSS antenna receive a GNSS satellite signal and transmit the GNSS satellite signal to the combined inertial navigation system host through a coaxial cable.

The LADCP is configured to observe ocean current profile measurement data in real time.

The combined inertial navigation system host observes a GNSS position, GNSS orientation data, three-axis acceleration data, a three-axis gyroscope angular velocity, a roll angle, a pitch angle and a course angular rate.

The data processing unit is connected to the wireless transmission module through a serial port, and the wireless transmission module is configured to transmit communication data between the data processing unit and a mother ship deck unit through the voltage-resistant wireless antenna.

The data processing unit is connected to the LADCP and the combined inertial navigation system host through serial ports to obtain the ocean current profile measurement data, the GNSS position, the GNSS orientation data, the three-axis acceleration data, the three-axis gyroscope angular velocity, the roll angle, the pitch angle and the course angular rate, and is configured to perform real-time high-precision correction on a three-dimensional flow velocity of an ocean current profile observed by the LADCP based on the GNSS orientation data, the roll angle, the pitch angle and the course angular rate.

In some embodiments, the combined observation system further includes a first voltage-resistant cabin 2, a second pressure-resistance cabin 3, and a third voltage-resistant cabin 5.

The first voltage-resistant cabin 2 and the second voltage-resistant cabin 3 are located above the outer portion of the instrument support 1.

The first GNSS antenna is mounted inside the first voltage-resistant cabin 2.

The second GNSS antenna is mounted inside the second voltage-resistant cabin 3.

The third voltage-resistant cabin 5 is positioned above the LADCP inside the instrument support 1, the combined inertial navigation system host, the data processing unit, the wireless transmission module, and the battery cabin are mounted inside the voltage-resistant cabin 5, and the voltage-resistant wireless antenna 4 is mounted above the third voltage-resistant cabin 5.

The first voltage-resistant cabin 2 and the second voltage-resistant cabin 3 are respectively connected to the third voltage-resistant cabin 5 through a coaxial watertight cable and a watertight connector assembly, and the LADCP 6 is connected to the third voltage-resistant cabin 5 through a watertight cable.

In some embodiments, the data processing unit may use an embedded collector of a PC 104 framework as a core, to read ocean current flow data of the LADCP through a first serial port, read GNSS position and orientation data of the combined inertial navigation system through a second serial port, read three-axis acceleration data of the combined inertial navigation system through a third serial port, read the three-axis acceleration, the roll angle, the pitch angle, and the course angular rate of the combined inertial navigation system through a fourth serial port, and perform data communication with the wireless transmission module through a fifth serial port. The data processing module synchronously collects data such as the flow velocity, the flow direction, the GNSS position, the GNSS direction, the roll angle, the pitch angle, the three-axis acceleration, the three-axis angular velocity, and speed on ground. The instrument support 1 is made of a non-magnetic material, mostly aluminum or 316L stainless steel. North of the LADCP is aligned with north of the combined inertial navigation system host.

A specific working principle and an operation method for the system are as follows.

An operation method for the LADCP to observe the ocean current profile measurement data in real time and for the combined inertial navigation system host to observe the GNSS position, the GNSS orientation data, the three-axis acceleration data, the three-axis gyroscope angular velocity, the roll angle, the pitch angle and the course angular rate includes the following steps.

S11: After an observation ship reaches an observation point, align a coordinate system of the LADCP to a coordinate system of the combined inertial navigation system host.

S12: Lift the combined observation system to a sea surface, and receive data transmitted back by the data processing unit by using a mother ship deck unit.

S13: Determine the GNSS position and the GNSS orientation data of the combined inertial navigation system host.

S14: Lower the combined observation system to an undersea preset depth to observe the ocean current profile measurement data.

S15: Withdraw the combined observation system after observing the ocean current profile measurement data.

Figure 3:
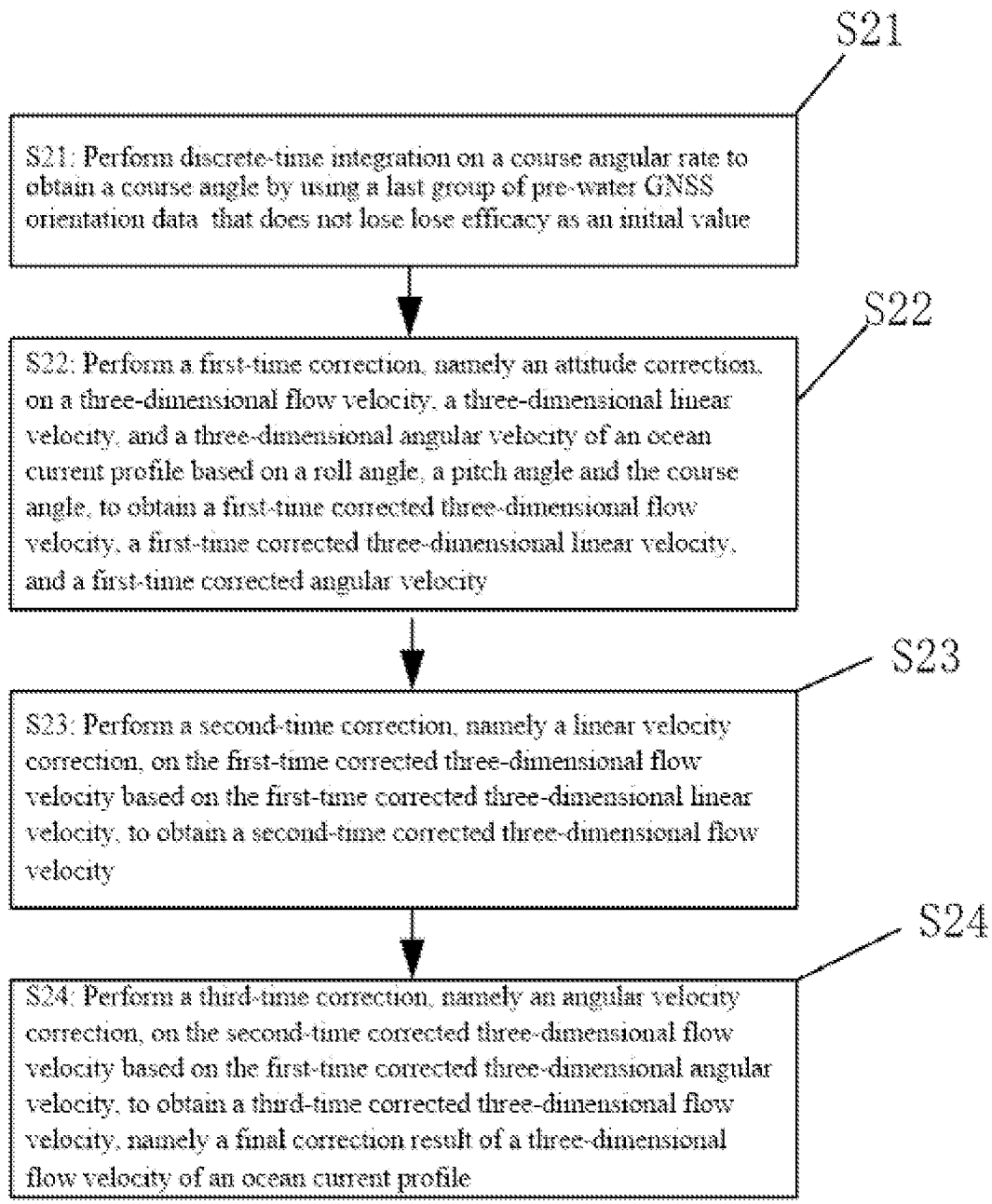
FIG. 3 is a flowchart of a method for performing real-time high-precision correction on a three-dimensional flow velocity of an ocean current profile observed by an LADCP based on the GNSS orientation data, the roll angle, the pitch angle and the course angular rate.

As shown in FIG. 3, in some embodiments, a method for performing real-time high-precision correction on a three-dimensional flow velocity of an ocean current profile observed by an LADCP based on the GNSS orientation data, the roll angle, the pitch angle and the course angular rate includes the following steps.

After a device enters water, the GNSS position and direction data may lose efficacy, and the boat, as a huge ferromagnetic object, may have a great impact on a direction measured by a magnetic compass of the LADCP, and even direction data with an error may appear.

S21: Perform discrete-time integration on the course angular rate to obtain a course angle by using a last group of pre-water GNSS orientation data Do that does not lose lose efficacy as an initial value.

S22: Perform a first-time correction, namely an attitude correction, on the three-dimensional flow velocity, a three-dimensional linear velocity, and a three-dimensional angular velocity of the ocean current profile based on the roll angle, the pitch angle and the course angle, to obtain a first-time corrected three-dimensional flow velocity, a first-time corrected three-dimensional linear velocity, and a first-time corrected angular velocity.

S23: Perform a second-time correction, namely a linear velocity correction, on the first-time corrected three-dimensional flow velocity based on the first-time corrected three-dimensional linear velocity, to obtain a second-time corrected three-dimensional flow velocity.

S24: Perform a third-time correction, namely an angular velocity correction, on the second-time corrected three-dimensional flow velocity based on the first-time corrected three-dimensional angular velocity, to obtain a third-time corrected three-dimensional flow velocity, namely a final correction result of the three-dimensional flow velocity of the ocean current profile.

Figure 4:
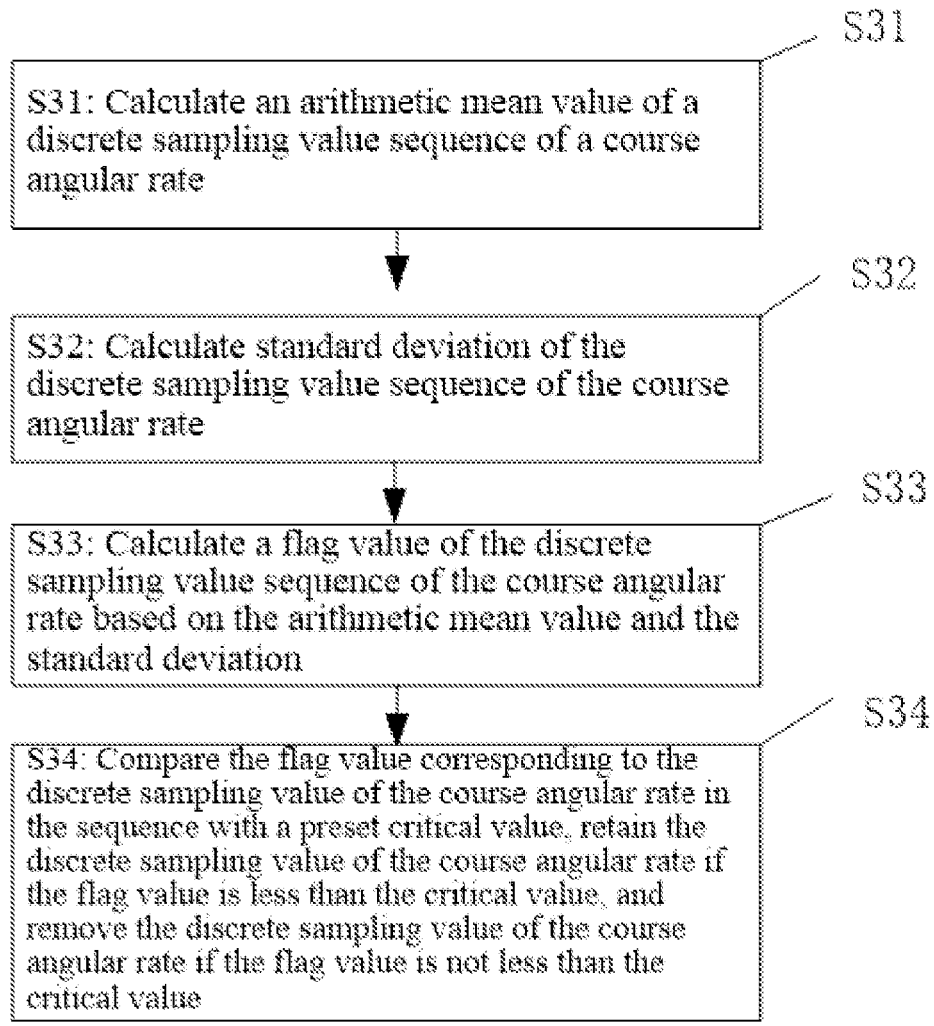
FIG. 4 is a flowchart of a method for eliminating an instant gross error, caused by a noise of an LADCP and an external environment, of a discrete sampling value of a course angular rate of the LADCP.

In some embodiments, before the performing discrete-time integration on the course angular rate to obtain a course angle by using a last group of pre-water GNSS orientation data $D_0$ that does not lose lose efficacy as an initial value, the method further includes:
  eliminating an instant gross error, caused by a noise of the LADCP and an external environment, of a discrete sampling value of the course angular rate of the LADCP, as shown in FIG. 4, the following steps are included.

S31: Calculate an arithmetic mean value of a discrete sampling value sequence of the course angular rate.

S32: Calculate standard deviation of the discrete sampling value sequence of the course angular rate.

S33: Calculate a flag value of the discrete sampling value sequence of the course angular rate based on the arithmetic mean value and the standard deviation, and a specific formula is as follows:

$$g_t = \frac{|(\Omega_{\gamma t} - \overline{\Omega_\gamma})|}{s},$$

where
$g_t$ represents a flag value of a sampling value t in the discrete sampling value sequence of the course angular rate, s represents the standard deviation, $\Omega_{\gamma t}$, represents a discrete sampling value of a $t^{th}$ course angular rate in the sequence, and $\overline{\Omega_\gamma}$ represents the arithmetic mean value;
calculate an arithmetic mean value of a discrete sampling value sequence of the course angular rate:

$$\overline{\Omega_\gamma} = \frac{1}{n}\sum_{t=1}^{n}\Omega_{\gamma t},$$

where
n represents a quantity of sampling values in the discrete sampling value sequence of the course angular rate; and
calculate standard deviation of the discrete sampling value sequence of the course angular rate:

$$s = \sqrt{\frac{\sum_{t=1}^{n}(\Omega_{\gamma t} - \overline{\Omega_\gamma})^2}{n-1}}.$$

S34: Compare a flag value corresponding to the discrete sampling value sequence of the course angular rate in the sequence with a preset critical value, retain the discrete sampling value sequence of the course angular rate if the flag value is less than the critical value, and remove the discrete sampling value sequence of the course angular rate if the flag value is not less than the critical value, where
  in this embodiment, the preset critical value is 3.28; and
  filter a direct-current component of the discrete sampling value sequence of the course angular rate, and a specific method includes:
  performing discrete Fourier transform on the discrete sampling value, the instant gross error of which is eliminated, of the course angular rate; and
  performing the discrete Fourier transform after setting a frequency spectrum component with a frequency of 0 in a spectrogram to 0, to obtain the discrete sampling value, the direct-current component of which is filtered, of the course angular rate.

In some embodiments, a method for performing discrete-time integration on the course angular rate to obtain a course angle by using a last group of pre-water GNSS orientation data $D_0$ that does not lose lose efficacy as an initial value includes:
  by taking the last group of pre-water GNSS orientation data $D_0$ that does not lose lose efficacy as the initial value and taking a sampling moment of the last group of pre-water GNSS orientation data that does not lose lose efficacy as a time zero, obtaining a rotation angle of the LADCP within a preset moment by using a method of performing discrete-time integration on the course angular rate, and obtaining the course angle by performing 360 remaining on the rotation angle of the LADCP, and a specific formula is as follows:

$$\gamma = \left(D_0 + \int_0^t \Omega_{\gamma t}dt\right)\% 360.$$

In some embodiments, a method for performing a first-time correction, namely an attitude correction, on the three-dimensional flow velocity, a three-dimensional linear velocity, and a three-dimensional angular velocity of the ocean current profile based on the roll angle, the pitch angle and the course angle, to obtain a first-time corrected three-dimensional flow velocity, a first-time corrected three-dimensional linear velocity, and a first-time corrected angular velocity level includes:

$X'=X \cos \beta \cos \gamma+Y(\cos \gamma \sin \alpha \sin \beta-\sin \gamma \cos \alpha)+Z(\cos \alpha \sin \beta \cos \gamma+\sin \alpha \sin \gamma)$ $Y'=X \sin \gamma \cos \beta+Y(\sin \alpha \sin \beta \sin \gamma+\cos \alpha \cos \gamma)+Z (\sin \beta \sin \gamma \cos \alpha-\cos \gamma \sin \alpha)$ $Z'=-X \sin \beta+Y \cos \beta \sin \alpha+Z \cos \alpha \cos \beta$, where (X,Y,Z) represents an corrected vector measurement result, $X\in\{nvt, V\alpha t, \Omega\alpha t\}$, $Y\in\{eut, V\beta t, \Omega\beta t\}$, $Z\in\{wt, V\gamma t, \Omega\gamma t\}$ and (nvt, eut, wt) represent three-dimensional flow velocities, $(V\alpha t, V\beta t, V\gamma t)$ represents the three-dimensional linear velocity, $(\Omega\alpha t, \Omega\beta t, \Omega\gamma t)$ represents the three-dimensional angular velocity, $\alpha$ represents the roll angle, $\beta$ represents the pitch angle, $\gamma$ represents the course angle, (X', Y', Z') represents a first-time corrected vector correction result, $X'\in\{nvt', V\alpha t', \Omega\alpha t'\}$, $Y'\in\{eut', V\beta t', \Omega\beta t'\}$, $Z'\in\{wt', V\gamma t', \Omega\gamma t'\}$ and (nvt', eut', wt') represent first-time corrected three-dimensional flow velocities, (Vαt', Vβt', Vγt') represents a first-time corrected three-dimensional linear velocity, and (Ωαt', Ωβt', Ωγt') represents a first-time corrected three-dimensional angular velocity.

In some embodiments, a method for performing a second-time correction, namely a linear velocity correction, on the first-time corrected three-dimensional flow velocity based on the first-time corrected three-dimensional linear velocity, to obtain a second-time corrected three-dimensional flow velocity includes: performing vector addition on the first-time corrected three-dimensional linear velocity and the first-time corrected three-dimensional flow velocity to obtain a second-time corrected three-dimensional flow velocity, and a specific formula is as follows:

(nvt",eut",wt")=(nvt',eut',wt')+(Vαt',Vβt',Vγt'), where (nvt", eut", wt") represents the second corrected three-dimensional flow velocity; and a method for performing a third-time correction, namely an angular velocity correction, on the second-time corrected three-dimensional flow velocity based on the first-time corrected three-dimensional angular velocity, to obtain a third-time corrected three-dimensional flow velocity includes:

multiplying a distance R between a beam outlet of the LADCP and a lifting point of the instrument support with the first-time corrected three-dimensional angular velocity to obtain a three-dimensional rotation linear velocity, and performing vector addition on the three-dimensional rotation linear velocity and the second-time corrected three-dimensional flow velocity to obtain the third-time corrected three-dimensional flow velocity, and a specific formula is as follows:

(NVt,EUt,Wt)=(nvt",eut",wt")+R×(Ωαt',Ωβt',Ωγt'), where (NVt, EUt, Wt) represents the third-time corrected three-dimensional flow velocity, namely the final correction result of the three-dimensional flow velocity of the ocean current profile.

Embodiment 2

Figure 2:
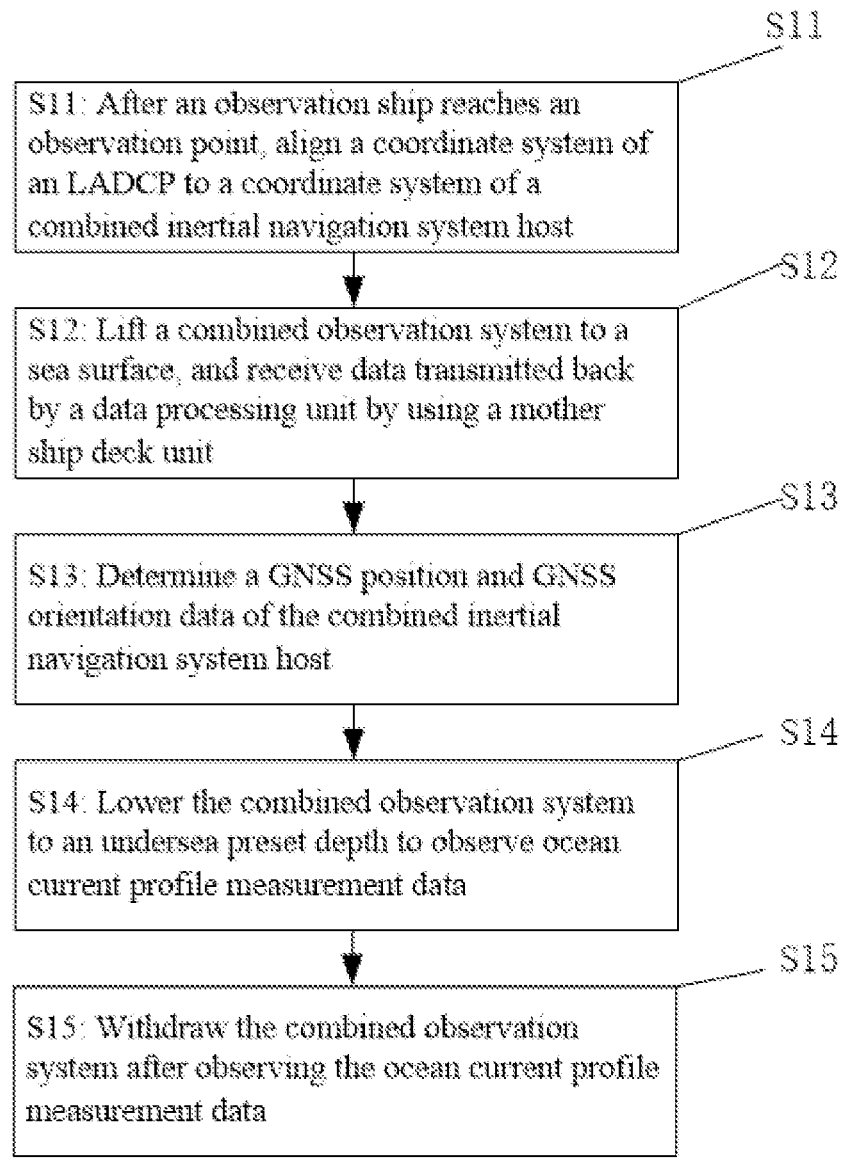
FIG. 2 is a flowchart of an LADCP and combined inertial navigation system combined observation method according to an embodiment of the present invention.

According to a second aspect of the present invention, an LADCP and combined inertial navigation system combined observation method is disclosed, which adopts the LADCP and combined inertial navigation system combined observation system according to the first aspect. As shown in FIG. 2, an operation method for the LADCP to observe the ocean current profile measurement data in real time and for the combined inertial navigation system host to observe the GNSS position, the GNSS orientation data, the three-axis acceleration data, the three-axis gyroscope angular velocity, the roll angle, the pitch angle and the course angular rate includes the following steps.

After an observation ship reaches an observation point, align a coordinate system of the LADCP to a coordinate system of the combined inertial navigation system host.

Lifting the combined observation system to a sea surface, and receive data transmitted back by the processing unit by using a mother ship deck unit.

Determine the GNSS position and the GNSS orientation data of the combined inertial navigation system host.

Lower the combined observation system to an undersea preset depth to observe the ocean current profile measurement data.

Withdraw the combined observation system after observing the ocean current profile measurement data.

As shown in FIG. 3, in some embodiments, a method for performing real-time high-precision correction on a three-dimensional flow velocity of an ocean current profile observed by an LADCP based on the GNSS orientation data, the roll angle, the pitch angle and the course angular rate includes the following steps.

After a device enters water, the GNSS position and direction data may lose efficacy, and the boat, as a huge ferromagnetic object, may have a great impact on a direction measured by a magnetic compass of the LADCP, and even direction data with an error may appear.

Perform discrete-time integration on the course angular rate to obtain a course angle by using a last group of pre-water GNSS orientation data $D_0$ that does not lose lose efficacy as an initial value.

Perform a first-time correction, namely an attitude correction, on the three-dimensional flow velocity, a three-dimensional linear velocity, and a three-dimensional angular velocity of the ocean current profile based on the roll angle, the pitch angle and the course angle, to obtain a first-time corrected three-dimensional flow velocity, a first-time corrected three-dimensional linear velocity, and a first-time corrected angular velocity.

Perform a second-time correction, namely a linear velocity correction, on the first-time corrected three-dimensional flow velocity based on the first-time corrected three-dimensional linear velocity, to obtain a second-time corrected three-dimensional flow velocity.

Perform a third-time correction, namely an angular velocity correction, on the second-time corrected three-dimensional flow velocity based on the first-time corrected three-dimensional angular velocity, to obtain a third-time corrected three-dimensional flow velocity, namely a final correction result of the three-dimensional flow velocity of the ocean current profile.

In some embodiments, before the performing discrete-time integration on the course angular rate to obtain a course angle by using a last group of pre-water GNSS orientation data $D_0$ that does not lose lose efficacy as an initial value, the method further includes:

eliminating an instant gross error, caused by a noise of the LADCP and an external environment, of a discrete sampling value of the course angular rate of the LADCP, as shown in FIG. 4, the following steps are included.

Calculate an arithmetic mean value of a discrete sampling value sequence of the course angular rate.

Calculate standard deviation of the discrete sampling value sequence of the course angular rate.

Calculate a flag value of the discrete sampling value sequence of the course angular rate based on the arithmetic mean value and the standard deviation, and a specific formula is as follows:

$$g_t = \frac{|(\Omega_{\gamma t} - \overline{\Omega_\gamma})|}{s},$$

where $g_t$ represents a flag value of a sampling value t in the discrete sampling value sequence of the course angular rate, s represents the standard deviation, $\Omega_{\gamma t}$ represents a discrete sampling value of a $t^{th}$ course angular rate in the sequence, and $\overline{\Omega_\gamma}$ represents the arithmetic mean value.

Calculate an arithmetic mean value of a discrete sampling value sequence of the course angular rate, $$\overline{\Omega_\gamma} = \frac{1}{n}\sum_{t=1}^{n}\Omega_{\gamma t},$$

where n represents a quantity of sampling values in the discrete sampling value sequence of the course angular rate.

Calculate standard deviation of the discrete sampling value sequence of the course angular rate:

$$s = \sqrt{\frac{\sum_{t=1}^{n}(\Omega_{\gamma t} - \overline{\Omega_\gamma})^2}{n-1}}.$$

Compare a flag value corresponding to the discrete sampling value sequence of the course angular rate in the sequence with a preset critical value, retain the discrete sampling value sequence of the course angular rate if the flag value is less than the critical value, and remove the discrete sampling value sequence of the course angular rate if the flag value is not less than the critical value, where in this embodiment, the preset critical value is 3.28.

Filter a direct-current component of the discrete sampling value sequence of the course angular rate, and a specific method includes:

performing discrete Fourier transform on the discrete sampling value, the instant gross error of which is eliminated, of the course angular rate; and performing the discrete Fourier transform after setting a frequency spectrum component with a frequency of 0 in a spectrogram to 0, to obtain the discrete sampling value, the direct-current component of which is filtered, of the course angular rate.

In some embodiments, a method for performing discrete-time integration on the course angular rate to obtain a course angle by using a last group of pre-water GNSS orientation data $D_0$ that does not lose lose efficacy as an initial value includes:

by taking the last group of pre-water GNSS orientation data $D_0$ that does not lose lose efficacy as the initial value and taking a sampling moment of the last group of pre-water GNSS orientation data that does not lose lose efficacy as a time zero, obtaining a rotation angle of the LADCP within a preset moment by using a method of performing discrete-time integration on the course angular rate, and obtaining the course angle by performing 360 remaining on the rotation angle of the LADCP, and a specific formula is as follows:

$$\gamma = \left(D_0 + \int_0^t \Omega_{\gamma t}dt\right)\% 360.$$

In some embodiments, a method for performing a first-time correction, namely an attitude correction, on the three-dimensional flow velocity, a three-dimensional linear velocity, and a three-dimensional angular velocity of the ocean current profile based on the roll angle, the pitch angle and the course angle, to obtain a first-time corrected three-dimensional flow velocity, a first-time corrected three-dimensional linear velocity, and a first-time corrected angular velocity level includes:

$X' = X\cos\beta\cos\gamma + Y(\cos\gamma\sin\alpha\sin\beta - \sin\gamma\cos\alpha) + Z(\cos\alpha\sin\beta\cos\gamma + \sin\alpha\sin\gamma)$ $Y' = X\sin\gamma\cos\beta + Y(\sin\alpha\sin\beta\sin\gamma + \cos\alpha\cos\gamma) + Z(\sin\beta\sin\gamma\cos\alpha - \cos\gamma\sin\alpha)$ $Z' = -X\sin\beta + Y\cos\beta\sin\alpha + Z\cos\alpha\cos\beta$, where (X,Y,Z) represents an corrected vector measurement result, $X \in \{nvt, V\alpha t, \Omega\alpha t\}$, $Y \in \{eut, V\beta t, \Omega\beta t\}$, $Z \in \{wt, V\gamma t, \Omega\gamma t\}$ and (nvt, eut, wt) represent three-dimensional flow velocities, ($V\alpha t, V\beta t, V\gamma t$) represents the three-dimensional linear velocity, ($\Omega\alpha t, \Omega\beta t, \Omega\gamma \tau$) represents the three-dimensional angular velocity, a represents the roll angle, R represents the pitch angle, $\gamma$ represents the course angle, (X', Y', Z') represents a first-time corrected vector correction result, $X' \in \{nvt', V\alpha t', \Omega\alpha t'\}$, $Y' \in \{eut', V\beta t', \Omega\beta t'\}$, $Z' \in \{wt', V\gamma t', \Omega\gamma t'\}$ and (nvt', eut', wt') represent first-time corrected three-dimensional flow velocities, ($V\alpha t', V\beta t', V\gamma t'$) represents a first-time corrected three-dimensional linear velocity, and ($\Omega\alpha t', \Omega\beta t', \Omega\gamma t'$) represents a first-time corrected three-dimensional angular velocity.

In some embodiments, a method for performing a second-time correction, namely a linear velocity correction, on the first-time corrected three-dimensional flow velocity based on the first-time corrected three-dimensional linear velocity, to obtain a second-time corrected three-dimensional flow velocity includes:

performing vector addition on the first-time corrected three-dimensional linear velocity and the first-time corrected three-dimensional flow velocity to obtain a second-time corrected three-dimensional flow velocity, and a specific formula is as follows:

$(nvt'', eut'', wt'') = (nvt', eut', wt') + (V\alpha t', V\beta t', V\gamma t')$, where (nvt'', eut'', wt'') represents the second corrected three-dimensional flow velocity; and a method for performing a third-time correction, namely an angular velocity correction, on the second-time corrected three-dimensional flow velocity based on the first-time corrected three-dimensional angular velocity, to obtain a third-time corrected three-dimensional flow velocity includes:

multiplying a distance R between a beam outlet of the LADCP and a lifting point of the instrument support with the first-time corrected three-dimensional angular velocity to obtain a three-dimensional rotation linear velocity, and performing vector addition on the three-dimensional rotation linear velocity and the second-time corrected three-dimensional flow velocity to obtain the third-time corrected three-dimensional flow velocity, and a specific formula is as follows:

$(NVt, EUt, Wt) = (nvt'', eut'', wt'') + R \times (\Omega\alpha t', \Omega\beta t', \Omega\gamma t')$, where (NVt, EUt, Wt) represents the third-time corrected three-dimensional flow velocity, namely the final correction result of the three-dimensional flow velocity of the ocean current profile.

In summary, compared with the conventional technology, technical solutions in various aspects of the present invention have the following advantages: measurement precision of a flow velocity and a flow direction by the LADCP is improved, and working costs of using the LADCP to carry out profile flow observation are reduced.

It should be noted that the technical features of the above embodiments can be combined arbitrarily. In order to make the description concise, all possible combinations of the technical features in the above embodiments are not described. However, as long as there is no contradiction in the combination of these technical features, it should be considered as the range described in this specification. The above-mentioned embodiments only express several implementations of the present application, and descriptions thereof are relatively specific and detailed, but should not be understood as limiting the scope of present invention. It is to be noted that several variations and modifications may also be made by a person skilled in the art without departing from the spirit of the present application, which all fall within the protection scope of the present application. Therefore, the protection scope of the patent of the present application shall be subjected to the appended claims.

The invention claimed is:

1. AN LADCP and combined inertial navigation system combined observation system, comprising an LADCP, a combined inertial navigation system host, a data processing unit, a wireless transmission module, a voltage-resistant wireless antenna, a battery cabin, a first GNSS antenna, a second GNSS antenna and an instrument support, wherein
the LADCP, namely a lowered type acoustic Doppler current profiler, is mounted below an inner portion of the instrument support, the combined inertial navigation system host, the data processing unit, the wireless transmission module and the battery cabin are separately mounted in the instrument host, the combined inertial navigation system host, the data processing unit, the wireless transmission module and the battery cabin are located above the LADCP, the voltage-resistant wireless antenna is mounted above the wireless transmission module, and the first GNSS antenna and the second GNSS antenna are mounted above an outer portion of the instrument support;
the battery cabin supplies power to the LADCP, the combined inertial navigation system host, the data processing unit, the wireless transmission module, the first GNSS antenna, and the second GNSS antenna;
the first GNSS antenna and the second GNSS antenna receive a GNSS satellite signal and transmit the GNSS satellite signal to the combined inertial navigation system host through a coaxial cable;
the LADCP is configured to observe ocean current profile measurement data in real time;
the combined inertial navigation system host observes a GNSS position, GNSS orientation data, three-axis acceleration data, a three-axis gyroscope angular velocity, a roll angle, a pitch angle and a course angular rate;
the data processing unit is connected to the wireless transmission module through a serial port, and the wireless transmission module is configured to transmit communication data between the data processing unit and a mother ship deck unit through the voltage-resistant wireless antenna;
the data processing unit is connected to the LADCP and the combined inertial navigation system host through serial ports to obtain the ocean current profile measurement data, the GNSS position, the GNSS orientation data, the three-axis acceleration data, the three-axis gyroscope angular velocity, the roll angle, the pitch angle and the course angular rate, and is configured to perform real-time high-precision correction on a three-dimensional flow velocity of an ocean current profile observed by the LADCP based on the GNSS orientation data, the roll angle, the pitch angle and the course angular rate;
the combined observation system further comprises a first voltage-resistant cabin, a second pressure-resistance cabin and a third voltage-resistant cabin, wherein
the first voltage-resistant cabin and the second voltage-resistant cabin are located above the outer portion of the instrument support;
the first GNSS antenna is mounted inside the first voltage-resistant cabin;
the second GNSS antenna is mounted inside the second voltage-resistant cabin;
the third voltage-resistant cabin is positioned above the LADCP inside the instrument support, the combined inertial navigation system host, the data processing unit, the wireless transmission module, and the battery cabin are separately mounted inside the voltage-resistant cabin, and the voltage-resistant wireless antenna is mounted above the third voltage-resistant cabin;
the first voltage-resistant cabin and the second voltage-resistant cabin are respectively connected to the third voltage-resistant cabin through a coaxial watertight cable and a watertight connector assembly, and the LADCP is connected to the third voltage-resistant cabin through a watertight cable; and
north of the LADCP is aligned with north of the combined inertial navigation system host;
an operation method for the LADCP to observe the ocean current profile measurement data in real time and for the combined inertial navigation system host to observe the GNSS position, the GNSS orientation data, the three-axis acceleration data, the three-axis gyroscope angular velocity, the roll angle, the pitch angle and the course angular rate comprises:
after an observation ship reaches an observation point, aligning a coordinate system of the LADCP to a coordinate system of the combined inertial navigation system host, that is, aligning the north of the LADCP to the north of the combined inertial navigation system host;
lifting the combined observation system to a sea surface, and receiving data transmitted back by the data processing unit by using a mother ship deck unit;
lowering the combined observation system to an undersea preset depth to observe the ocean current profile measurement data; and
withdrawing the combined observation system after observing the ocean current profile measurement data.

2. The LADCP and combined inertial navigation system combined observation method according to claim 1, wherein the operation method further comprises:
after determining the GNSS position and the GNSS orientation data of the combined inertial navigation system host, lowering the combined observation system to the undersea preset depth.

3. The LADCP and combined inertial navigation system combined observation method according to claim 2, wherein a method for performing real-time high-precision correction on the three-dimensional flow velocity of the ocean current profile observed by the LADCP based on the GNSS orientation data, the roll angle, the pitch angle and the course angular rate comprises:
performing discrete-time integration on the course angular rate to obtain a course angle by using a last group of pre-water GNSS orientation data $D_0$ that does not lose lose efficacy as an initial value;
performing a first-time correction, namely an attitude correction, on the three-dimensional flow velocity, a three-dimensional linear velocity, and a three-dimensional angular velocity of the ocean current profile based on the roll angle, the pitch angle and the course angle, to obtain a first-time corrected three-dimensional flow velocity, a first-time corrected three-dimensional linear velocity, and a first-time corrected angular velocity;

performing a second-time correction, namely a linear velocity correction, on the first-time corrected three-dimensional flow velocity based on the first-time corrected three-dimensional linear velocity, to obtain a second-time corrected three-dimensional flow velocity; and performing a third-time correction, namely an angular velocity correction, on the second-time corrected three-dimensional flow velocity based on the first-time corrected three-dimensional angular velocity, to obtain a third-time corrected three-dimensional flow velocity, namely a final correction result of the three-dimensional flow velocity of the ocean current profile.

4. The LADCP and combined inertial navigation system combined observation method according to claim 3, wherein before the performing discrete-time integration on the course angular rate to obtain a course angle by using a last group of pre-water GNSS orientation data $D_0$ that does not lose lose efficacy as an initial value, the method further comprises:

eliminating an instant gross error, caused by a noise of the LADCP and an external environment, of a discrete sampling value of the course angular rate of the LADCP, and a specific method comprises:

calculating an arithmetic mean value of a discrete sampling value sequence of the course angular rate;

calculating standard deviation of the discrete sampling value sequence of the course angular rate;

calculating a flag value of the discrete sampling value sequence of the course angular rate based on the arithmetic mean value and the standard deviation, and a specific formula is as follows:

$$g_t = \frac{|(\Omega_{\gamma t} - \overline{\Omega_\gamma})|}{s},$$

wherein $g_t$ represents a flag value of a sampling value t in the discrete sampling value sequence of the course angular rate, s represents the standard deviation, $\Omega_{\gamma t}$ represents a discrete sampling value of a $t^{th}$ course angular rate in the sequence, and $\overline{\Omega_\gamma}$ represents the arithmetic mean value;

comparing a flag value corresponding to the discrete sampling value sequence of the course angular rate in the sequence with a preset critical value, retaining the discrete sampling value sequence of the course angular rate if the flag value is less than the critical value, and removing the discrete sampling value sequence of the course angular rate if the flag value is not less than the critical value;

filtering a direct-current component of the discrete sampling value sequence of the course angular rate, and a specific method comprises:

performing discrete Fourier transform on the discrete sampling value, the instant gross error of which is eliminated, of the course angular rate; and performing the discrete Fourier transform after setting a frequency spectrum component with a frequency of 0 in a spectrogram to 0, to obtain the discrete sampling value, the direct-current component of which is filtered, of the course angular rate.

5. The LADCP and combined inertial navigation system combined observation method according to claim 3, wherein a method of performing discrete-time integration on the course angular rate to obtain a course angle by using a last group of pre-water GNSS orientation data $D_0$ that does not lose lose efficacy as an initial value comprises:

by taking the last group of pre-water GNSS orientation data $D_0$ that does not lose lose efficacy as the initial value and taking a sampling moment of the last group of pre-water GNSS orientation data that does not lose lose efficacy as a time zero, obtaining a rotation angle of the LADCP within a preset moment by using a method of performing discrete-time integration on the course angular rate, and obtaining the course angle by performing 360 remaining on the rotation angle of the LADCP.

6. The LADCP and combined inertial navigation system combined observation method according to claim 3, wherein a method of performing a first-time correction on a three-dimensional flow velocity, a three-dimensional linear velocity, and a three-dimensional angular velocity of the ocean current profile based on the roll angle, the pitch angle and the course angle, to obtain a first-time corrected three-dimensional flow velocity, a first-time corrected three-dimensional linear velocity, and a first-time corrected angular velocity level comprises:

$X'=X \cos \beta \cos \gamma + Y(\cos \gamma \sin \alpha \sin \beta - \sin \gamma \cos \alpha) + Z(\cos \alpha \sin \beta \cos \gamma + \sin \alpha \sin \gamma)$ $Y'=X \sin \gamma \cos \beta + Y(\sin \alpha \sin \beta \sin \gamma + \cos \alpha \cos \gamma) + Z (\sin \beta \sin \gamma \cos \alpha - \cos \gamma \sin \alpha)$ $Z'=-X \sin \beta + Y \cos \beta \sin \alpha + Z \cos \alpha \cos \beta$, wherein (X,Y,Z) represents an corrected vector measurement result, $X \in \{nvt, V\alpha t, \Omega\alpha t\}$, $Y \in \{eut, V\beta t, \Omega\beta t\}$, $Z \in \{wt, V\gamma t, \Omega\gamma t\}$ and (nvt, eut, wt) represent three-dimensional flow velocities, ($V\alpha t, V\beta t, V\gamma t$) represents the three-dimensional linear velocity, ($\Omega\alpha t, \Omega\beta t, \Omega\gamma t$) represents the three-dimensional angular velocity, $\alpha$ represents the roll angle, $\beta$ represents the pitch angle, $\gamma$ represents the course angle, (X', Y', Z') represents a first-time corrected vector correction result, $X' \in \{nvt', V\alpha t', \Omega\alpha t'\}$, $Y' \in \{eut', V\beta t', \Omega\beta t'\}$, $Z' \in \{wt', V\gamma t', \Omega\gamma t'\}$ and (nvt', eut', wt') represent first-time corrected three-dimensional flow velocities, ($V\alpha t', V\beta t', V\gamma t'$) represents a first-time corrected three-dimensional linear velocity, and ($\Omega\alpha t', \Omega\beta t', \Omega\gamma t'$) represents a first-time corrected three-dimensional angular velocity.

7. The LADCP and combined inertial navigation system combined observation method according to claim 6, wherein a method of performing a second-time correction on the first-time corrected three-dimensional flow velocity based on the first-time corrected three-dimensional linear velocity to obtain a second-time corrected three-dimensional flow velocity comprises:

performing vector addition on the first-time corrected three-dimensional linear velocity and the first-time corrected three-dimensional flow velocity to obtain a second-time corrected three-dimensional flow velocity, and a specific formula is as follows:

$(nvt'', eut'', wt'')=(nvt', eut', wt')+(V\alpha t', V\beta t', V\gamma t')$, wherein (nvt", eut", wt") represents the second corrected three-dimensional flow velocity; and a method for performing a third-time correction, namely an angular velocity correction, on the second-time corrected three-dimensional flow velocity based on the first-time corrected three-dimensional angular velocity, to obtain a third-time corrected three-dimensional flow velocity comprises:

multiplying a distance R between a beam outlet of the LADCP and a lifting point of the instrument support with the first-time corrected three-dimensional angular velocity to obtain a three-dimensional rotation linear velocity, and performing vector addition on the three-dimensional rotation linear velocity and the second-time corrected three-dimensional flow velocity to obtain the third-time corrected three-dimensional flow velocity, and a specific formula is as follows:

$$(NVt, EUt, Wt) = (nvt'', eut'', wt'') + R \times (\Omega\alpha t', \Omega\beta t', \Omega\gamma t'),$$
wherein (NVt, EUt, Wt) represents the third-time corrected three-dimensional flow velocity, namely the final correction result of the three-dimensional flow velocity of the ocean current profile.

\* \* \* \* \*